(12) United States Patent
Roemer et al.

(10) Patent No.: US 6,698,778 B2
(45) Date of Patent: Mar. 2, 2004

(54) AIR SUSPENSION HAVING A CLOSED COMPRESSED-AIR SYSTEM

(75) Inventors: Matthias Roemer, Altdorf (DE); Hans Scheerer, Esslingen (DE); Frank Schweickhardt, Stuttgart (DE)

(73) Assignee: DaimlerChrysler AG, Stuttgart (DE)

( * ) Notice: Subject to any disclaimer, the term of this patent is extended or adjusted under 35 U.S.C. 154(b) by 49 days.

(21) Appl. No.: 09/992,745

(22) Filed: Nov. 5, 2001

(65) Prior Publication Data

US 2002/0070523 A1 Jun. 13, 2002

(30) Foreign Application Priority Data

Nov. 7, 2000 (DE) .......................... 100 55 108

(51) Int. Cl.[7] ................................. B60G 9/04
(52) U.S. Cl. .................. 280/124.157; 280/124.158; 280/124.159; 280/124.161
(58) Field of Search ............... 280/124.157, 124.158, 280/124.159; 282/124.161

(56) References Cited

U.S. PATENT DOCUMENTS

| | | | | |
|---|---|---|---|---|
| 4,799,707 A | * | 1/1989 | Buma et al. .......... 280/124.161 |
| 4,881,753 A | * | 11/1989 | Shima et al. ............ 280/6.157 |
| 4,973,855 A | * | 11/1990 | Kamimura et al. ...... 280/5.501 |
| 5,014,199 A | * | 5/1991 | Konishi et al. ............... 701/37 |
| 5,047,938 A | * | 9/1991 | Yokote et al. ................ 701/37 |
| 5,322,321 A | * | 6/1994 | Yopp ....................... 280/6.158 |
| 5,465,209 A | * | 11/1995 | Sammut et al. ............... 701/37 |
| 6,116,586 A | * | 9/2000 | Westerkamp et al. .... 267/64.28 |
| 6,354,617 B1 | * | 3/2002 | Behmenburg et al. ................... 280/124.157 |

FOREIGN PATENT DOCUMENTS

| | | |
|---|---|---|
| DE | 33 39 080 | 5/1985 |
| DE | 199 59 556 | 12/2000 |

OTHER PUBLICATIONS

"Fachkunde Kraftfahzzeugtechnik" (Techical Book on Automotive Engineering).

* cited by examiner

Primary Examiner—Eric Culbreth
Assistant Examiner—Toan C To
(74) Attorney, Agent, or Firm—Kenyon & Kenyon

(57) ABSTRACT

An air suspension for a vehicle includes at least one air spring per wheel at at least one vehicle axle, one pump, at least one accumulator, and one circuit arrangement for connecting these units, the pressure side of the pump being connected to the accumulator or the air springs. To form a closed compressed-air system, the intake side of the pump is connected via at least one valve to the accumulator or the air springs, and at least the air-guiding interior pump chambers between the intake side and the pressure side of the pump have a pressure-tight design. The air suspension system requires comparably low energy consumption and small unit volume at a high level of efficiency.

19 Claims, 3 Drawing Sheets

US 6,698,778 B2

AIR SUSPENSION HAVING A CLOSED COMPRESSED-AIR SYSTEM

FIELD OF THE INVENTION

The present invention relates to an air suspension for a vehicle, having at least one air spring per wheel at least one vehicle axle, one pump, at least one accumulator, and one circuit arrangement for connecting these units, the pressure side of the pump being connected to the accumulator or the air springs.

BACKGROUND INFORMATION

Such an air suspension is described in "Fachkunde Kraftfahrzeugtechnik" (Technical Book on Automotive Engineering), Europa-Lehrmittel Publishers, 42781 Haan-Gruiten, 25th Ed., page 420. The represented air spring is based on an open compressed-air system, i.e., an accumulator is filled via a pump with fresh air drawn in from the environment and held at a minimum pressure. The compressed air no longer needed in the gas springs is discharged into the environment via a valve. Energy is lost in a number of different ways by releasing compressed air. Among other things, it is the energy that was needed to compress the released air quantity, as well as the energy that was needed for the air purification.

It is an object of the present invention to provide an air suspension system that requires comparably low energy consumption and small unit volume at a high level of efficiency. In addition, the air suspension system is to have short control and response times and only low noise emission.

SUMMARY

The above and other beneficial objects of the present invention are achieved by providing an air suspension for a vehicle as described herein. To form a closed compressed-air system, the intake side of the pump is connected via at least one valve to the accumulator or the air springs, and at least the air-guiding interior pump chambers between the intake side and the pressure side of the pump have a pressure-tight arrangement.

Within a closed compressed-air system, the pump represents a type of gas-pressure-tight, pressure-increasing valve that returns the compressed air no longer needed by the air springs to the accumulator instead of releasing it into the environment. Thus, apart from the potential usual leaks, no purified compressed air is lost in this system, and the pump may be configured for relatively small increases in pressure, since, with the exception of air leak compensation, only precompressed air is moved.

The regulating processes of the system are performed between the accumulator and the air springs almost always in a pump-supported manner. Fresh air from outside is only drawn in when the control unit determines that a certain air quantity in the system is not sufficient. In this case, fresh air is drawn in from the surroundings without interrupting the pump process fed until this point, e.g., by the accumulator. For this purpose, the fresh-air connection, in the downstream intake line of which, e.g., an automatically opening non-return valve is located, is situated between the intake side of the pump and the valve or valves that connects or connect the intake side of the pump either to the accumulator or the air springs.

The missing air quantity drawn in from the environment is processed, among other things, by filtering, drying, and, in some instances, deoiling or oiling. The pump support is not necessary when the required spring air pressure is significantly less than the current accumulator pressure. In this case, during a lifting operation, the air flowing to the air springs flows via valves, bypassing the pump.

DETAILED DESCRIPTION

Figure 1:
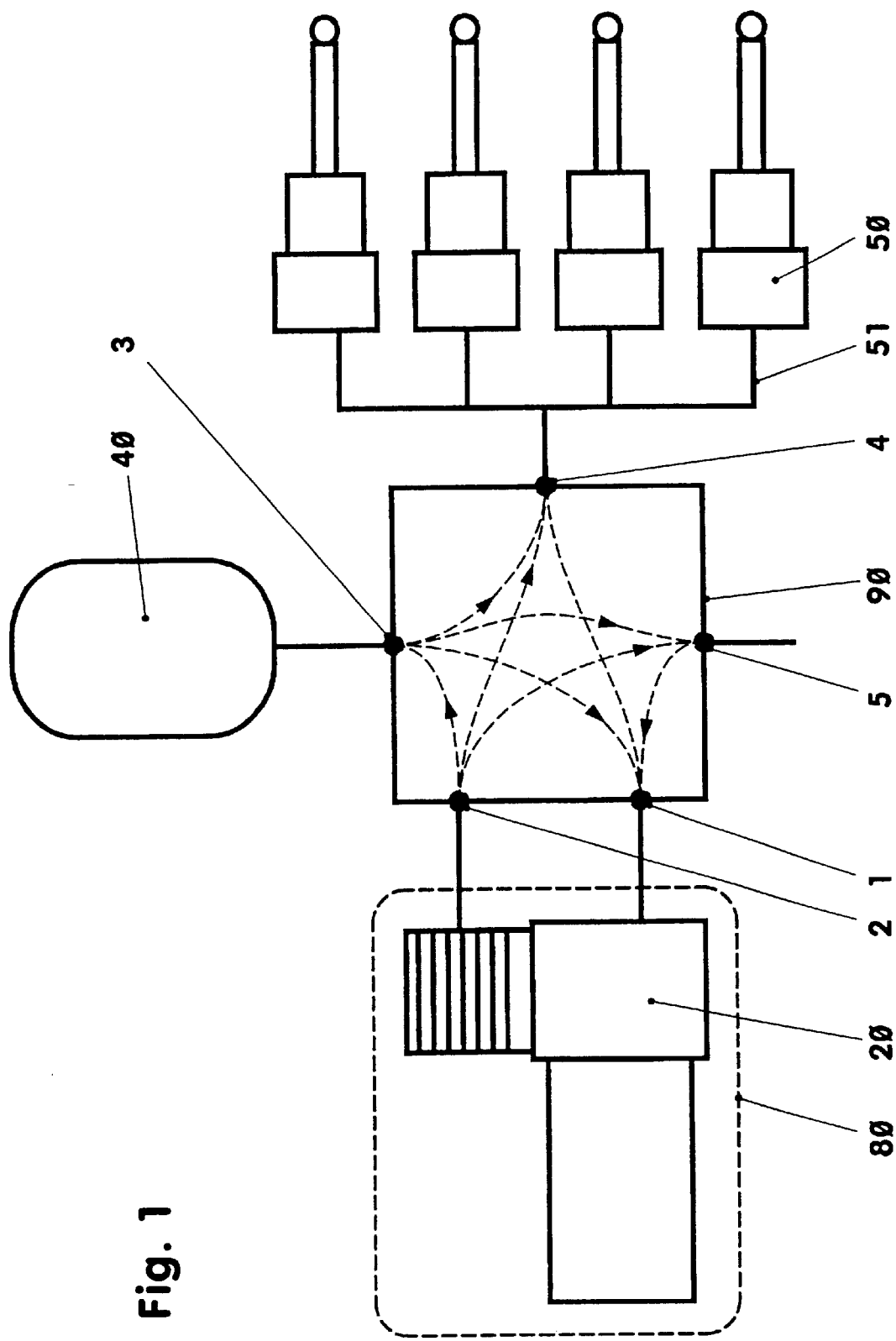
FIG. 1 is a schematic view of the circuit states of the load leveling.

FIG. 1 illustrates a pump (20), an accumulator (40), and, e.g., four air springs (50) largely having no air loss, as they are typically installed in air-suspended vehicles between the chassis and the vehicle body. All three structural components (20, 40, 50) are connected to one another in a closed system via a pneumatic circuit indicated as black box (90). Black box (90) includes five connections (1 to 5), of which two (1, 2) are connected to pump (20), one connection (3) is connected to accumulator (40), and one connection (4) is connected to a distribution line (51) leading to air springs (50). A fifth connection (5) leads into the surroundings.

The operation of the air suspension may be described on the basis of four different circuit states. In a first circuit state, air springs (50) are supplied with compressed air via the pressure-side output of pump (20) at connection (2), in order to rebound the springs, e.g., when beginning travel or when changing the static or dynamic wheel loads. Among other things, connections (2) and (4) as well as (3) and (1) are interconnected with one another in black box (90) for this purpose. The pump 20 includes air-guided interior pump chambers arranged between the intake side and the pressure side having a pressure-tight configuration.

In a second circuit state, among other things, connections (4) and (1) as well as (2) and (3) are connected to one another in black box (90) for unloading or emptying air springs (50). In this context, connection (1) leads to the suction-side input of pump (20).

In a third circuit state, to fill accumulator (40) with air from the surroundings or fresh air, connections (2) and (3) as well as (5) and (1) are internally interconnected in black box (90) in order to connect the pressure side of pump (20) to accumulator (40).

In a fourth circuit state, connections (3) and (5) in black box (90) are short-circuited to unload or empty accumulator (40).

When the vehicle is in operation, the four circuit states are initiated individually or in combination.

Figure 2:
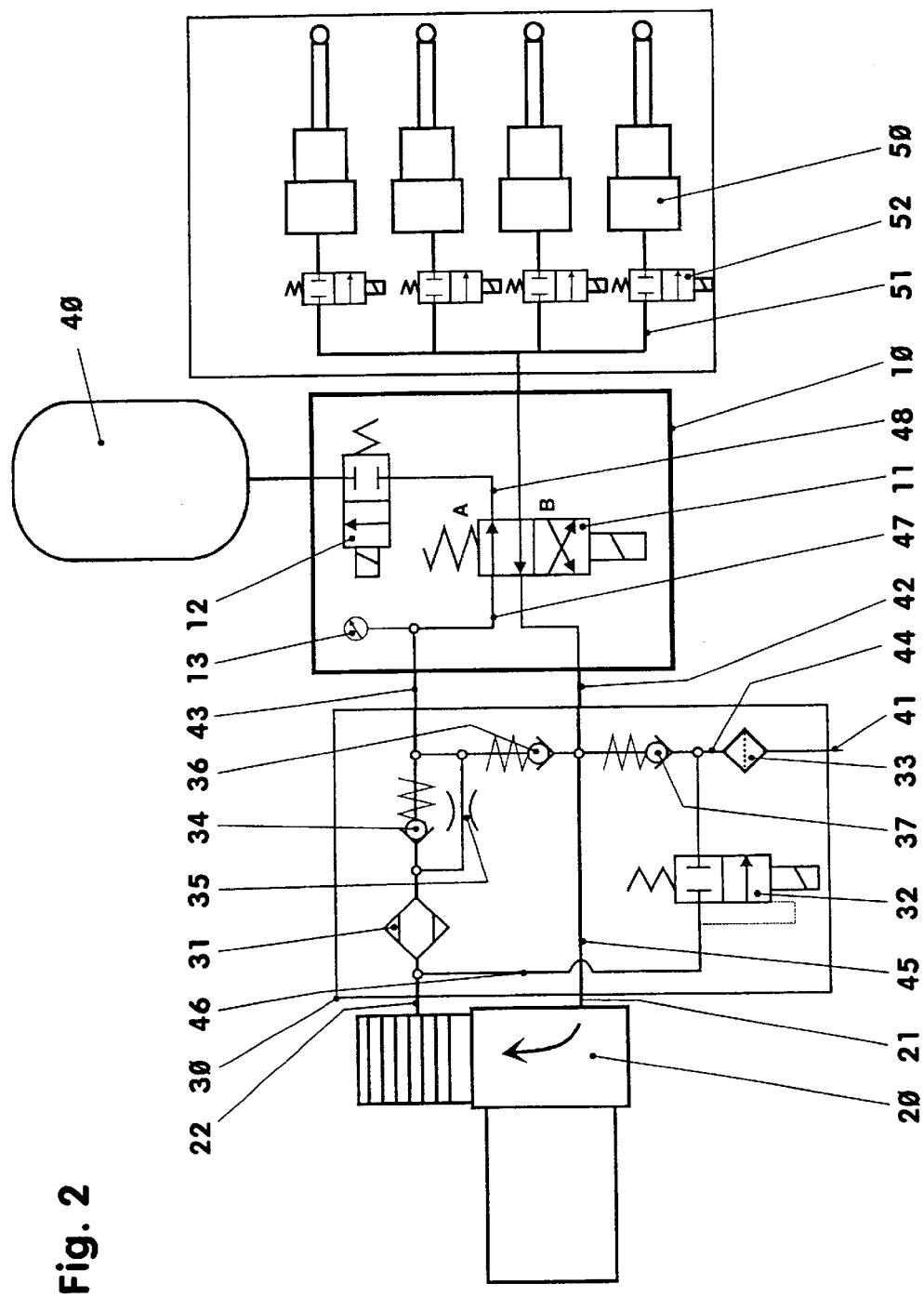
FIG. 2 is a schematic circuit diagram for producing the circuit states illustrated in FIG. 1.
Figure 3:
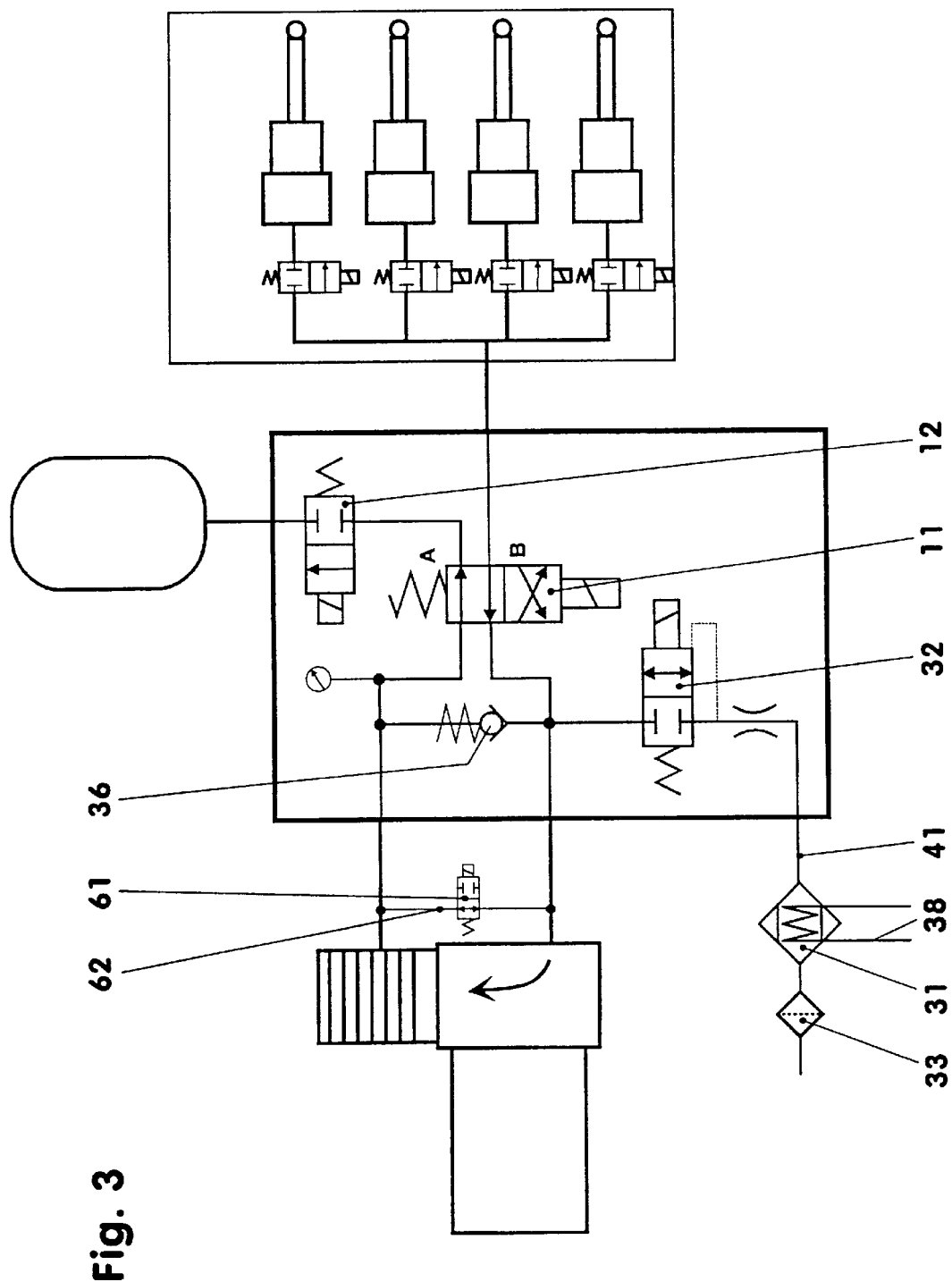
FIG. 3 is a schematic circuit diagram having another drier configuration.

As illustrated in FIGS. 2 and 3, the functional connection arrows of ideal connections (1 to 5) illustrated in black box (90) in accordance with FIG. 1 are illustrated as discrete circuits. For this purpose, the lines, valves, sensors, filters, driers, etc. are functionally divided up among a pressure change circuit (30) and a pressure distribution circuit (10).

The compressed air is, for example, drawn in, released, filtered, and dried via pressure change circuit (30) in combination with pump (20), and the low pressure air supplied to the circuit is supplied to pump (20) to be made available with increased pressure as needed at the circuit boundary. To produce compressed air, pump (20) draws in fresh air from the environment on its suction-side input (21) via a fresh-air connection (41), a filter (33), an intake line (44), and a non-return valve (37). Compressed return air or service air from accumulator (40) or from air springs (50) is available at a return-air connection (42) at intake line (45), which leads to pump (20). To prevent the return air available at return-air connection (42) from escaping into the environment, non-return valve (37) is closed in the direction of filter (33) and fresh-air connection (41).

The air compressed by pump (20) is fed into pressure change circuit (30) via pressure-side output (22). The air is made available at a compressed-air connection (43) via a drier (31) and a spring-loaded non-return valve (34). Non-return valve (34) is closed in the direction of drier (31). Arranged in parallel to non-return valve (34) and between drier (31) and compressed-air connection (43) is a throttle valve or orifice valve (35).

Compressed-air connection (43) is also connected to intake line (45) via a non-return valve (36). Spring-loaded non-return valve (36) is closed in the direction of intake line (45). As a result of this arrangement, control processes may be performed in the case of pressure drops without supplying energy or running the pump. In this context, an additional pump support (e.g., quick release) is also possible.

Connected between pressure-side output (22) of pump (20) and drier (31) is an air-discharge line (46), which is lead through a discharge valve (32) and empties into intake line (44), between filter (33) and non-return valve (37). Discharge valve (32) is a 2/2 directional control valve that is held in a blocking or a neutral position with a mechanical return spring. When actuated, the valve member moves electromagnetically and/or in a pressure-controlled manner into the flow-through or open position, functioning as a pressure relief valve. The control line needed for the pressure control leads between drier (31) and valve (32) into discharge line (46).

The connections of distribution circuit (10) connect air springs (50), accumulator (40) and pressure change circuit (30). A central component part of distribution circuit (10) is a return-spring-loaded 4/2 directional control valve (11) having two pass-through or open positions and electromagnetic actuation. This valve is also designated as main valve (11).

In a neutral position A of main valve (11), distribution line (51), which comes from air springs (50), is directly connected via intake line (45) to input (21) of the intake side of pump (20). Compressed-air connection (43), which is serviced by the pressure side of pump (20) among other things, is connected via accumulator lines (47) and (48) to pressure accumulator (40).

When main valve (11) is in actuating position B, accumulator (40) is connected to the intake side of pump (20) while air springs (50) are adjacent to the pressure side of pump (20).

Located in accumulator line (48) between main valve (11) and accumulator (40) is a so-called accumulator charging valve (12), which is configured as an electromagnetically actuatable 2/2 directional control valve, which is closed in the neutral position and includes mechanical spring return.

A pressure sensor (13) is situated in accumulator line (47), which extends between pressure connection (43) and main valve (11).

As illustrated in FIG. 2, a 2/2 directional control valve (52) configured to be closed in the neutral position is arranged, in each case, in connecting line (51) before each air spring (50). Valves (52), which are, for example, return-spring-loaded, have electromagnetic actuation. The individual directional control valves (52) may be arranged directly at air springs (50), for example. Alternatively, they may also be arranged individually or in combination in a valve block, in connecting line (51). Directional control valves (52) may also be integrated in distribution circuit (10).

The whole system, i.e., air springs, accumulator, lines, valves, and pump, is precharged with compressed air. In the case of typical air springs in passenger cars and off-road vehicles, for example, the corresponding average pressure level (basic pressure) is approximately 6 to 9 bar. In the case of a new vehicle, the precharging is performed at the assembly plant with an external compressed-air source. In the event that service or repairs are needed, this may possibly be performed by an in-vehicle compressor.

When precharging the system, the valve member of accumulator charging valve (12) is moved into the flow-through position by an electrical control system. Pump (20), to which current is at least almost contemporaneously supplied for this purpose, draws in fresh air from the environment via filter (33) and non-return valve (37). No return air is available at return-air connection (42), since 2/2 directional control valve (52), which is arranged in front of air springs (50), is closed. Pump (20) feeds the suctioned fresh air via drier (31) and valves (11, 12) into accumulator (40). Accumulator (40) is filled until pressure sensor (13) in accumulator line (47) signals that the necessary high-pressure level of the control system has been reached. After reaching the high-pressure level, accumulator charging valve (12) is closed. The valve member of main valve (11) is moved against the pressure of the return spring into actuation position B. At the same time, valves (52), which are connected in series with air springs (50), are electromagnetically forced into the flow-through position. Then, pump (20) fills air springs (50) until the system pressure is reached. After reaching the system pressure, valves (11, 52) and pump (20) are switched off or are de-energized.

The precharging process is also completely or partially used to compensate for air leaks or pressure losses.

To lift the vehicle with the aid of air springs (50), accumulator charging valve (12) and valves (11, 52) are initially forced into the operating position or opened one after the other for a short time. In this context, central pressure sensor (13) measures the accumulator pressure and the air spring pressure separately from one another over time. While the valve member of main valve (11) is in operating position B and valves (52) are open, accumulator charging valve (12) is opened. As long as the pressure in accumulator (40) is greater than in air springs (50), the accumulator air flows without pump support via return connection (42), non-return valve (36), compressed-air connection (43), accumulator line (47), and distribution line (51) into air springs (50).

However, if the accumulator pressure is too low for a control process precalculated by the control unit or the pressure in air springs (50) is greater than in accumulator (40), the control system switches on pump (20) and feeds drawn-in air via drier (31) and non-return valve (34) from accumulator (40) into air springs (50).

If the desired pressure level is reached, all valves (12, 52) are closed and pump (20) is switched off, if applicable.

When the vehicle is to be lowered, the valve member of main valve (11) is forced into neutral position A after the pressure measuring process for accumulator (40) and air springs (50). If the pressure in accumulator (40) is greater than in air springs (50), pump (20), with an open accumulator charging valve (12), feeds the air aspirated air springs (50) via drier (31), non-return valve (34), and valve (12) into accumulator (40). If central pressure sensor (13) measures an unfavorably high system pressure, air from accumulator (40) or from air springs (50) may be discharged via throttle (35), drier (31), and discharge valve (32).

If the pressure in accumulator (40) is less than in air springs (50), the compressed air flows via main valve (11), non-return valve (36), and accumulator lines (47, 48) into accumulator (40) until the pressure is equalized. Just prior to the pressure equalization, the control system starts pump (20) in order to feed the discharged air from air springs (50) into accumulator (40), provided that the control algorithm for control processes does not always intend for the pump to be in operation.

The pumps illustrated in FIGS. 1 to 3 may have an outwardly pressure-tight housing, because they are subjected to system pressure at suction connection (21) as well as at pressure connection (22). To avoid a housing having a complex seal, the entire pump (20) may be integrated in a pressure tank (80). Only suction connection (21), pressure connection (22), and the line for the current and signal cable are brought out from pressure tank (80), which is indicated by a dotted line in FIG. 1. Pressure tank (80) additionally outwardly dampens the noise caused by the pump drive and the internal air flow.

Noise emission may also be reduced by regulating the rotational speed of the pump. For example, the rotational speed when the vehicle is at a standstill or traveling slowly may be decreased via the control system.

FIG. 3 illustrates an example embodiment having a simplified drier circuit. Pressure change circuit (30) and distribution circuit (10) are combined to form one unit, the filter and the drier being outside of the unit in air-discharge line or intake line (41). For regeneration, drier (31) may be equipped with a demand-controlled heater (38), for example.

A heater (38) may be eliminated in the drier if drier (31) is appropriately dimensioned to absorb all moisture over the lifetime or if there are connections on drier (31) for regular external regeneration that may be performed during maintenance. The number of air refill processes or the refill volume flow may be measured via the control system in order to thus determine the degree of saturation of the drier.

Independent of this, a connecting line (62) having an integrated bypass valve (61) is located at pump (20) between suction connection (21) and pressure connection (22) as illustrated in FIG. 3. This valve (61) is, for example, an electromagnetically actuatable, spring-force-restoring 2/2 directional control valve, which is open in the neutral position. With valve (61), connections (21) and (22) may be short-circuited, e.g., during start up or run down, in order to thus soften the shock of staring and stopping and to enable an energy-saving start up. When valve (61) is configured to be open when no current is supplied to it, current may be supplied to valve (61) at the same time as to the pump motor, for example. It is also possible to provide triggering via the system control as a function of further boundary conditions.

In the entire system, any other suitable gas may be used instead of compressed air.

What is claimed is:

1. An air suspension system for a vehicle, comprising:
   a pump having a pressure side to connect to one of at least one accumulator and at least one air spring per wheel of at least one vehicle axle;
   a circuit arrangement to connect the air spring, the pump and the accumulator;
   an integrated pressure sensor; and
   at least one valve connecting an intake side of the pump to one of the accumulator and the air spring to form a closed compressed-air system;
   wherein the pump includes air-guided interior pump chambers arranged between the intake side and the pressure side having a pressure-tight configuration;
   wherein the valve includes a 4/2 directional control valve configured to connect the accumulator to the pressure side of the pump and the air spring to the intake side of the pump in a flow-through, neutral position and to connect the accumulator to the intake side of the pump and the air spring to the pressure side of the pump in an externally actuated, flow-through position.

2. The air suspension system according to claim 1, wherein the compressed-air system is configured to be precharged to a basic pressure corresponding to an average vehicle load.

3. The air suspension system according to claim 2, further comprising: a pressure tank, the pump being integrated in the pressure tank.

4. The air suspension system according to claim 2, further comprising: a connecting line including an integrated bypass valve arranged between the intake side of the pump and the pressure side of the pump, the bypass valve being configured to at least intermittently open the connecting line during an acceleration operation of a pump drive.

5. The air suspension system according to claim 1, further comprising:
   a pressure tank, the pump being integrated in the pressure tank.

6. The air suspension system according to claim 5, further comprising: a connecting line including an integrated bypass valve arranged between the intake side of the pump and the pressure side of the pump, the bypass valve being configured to at least intermittently open the connecting line during an acceleration operation of a pump drive.

7. The air suspension system according to claim 1, wherein fresh air is configured to be drawn in between the intake side of the pump and the valve.

8. The air suspension system according to claim 7, wherein the compressed-air system is configured to be precharged to a basic pressure corresponding to an average vehicle load.

9. The air suspension system according to claim 7, further comprising: a pressure tank, the pump being integrated in the pressure tank.

10. The air suspension system according to claim 7, further comprising: a connecting line including an integrated bypass valve arranged between the intake side of the pump and the pressure side of the pump, the bypass valve being configured to at least intermittently open the connecting line during an acceleration operation of a pump drive.

11. The air suspension system according to claim 7, further comprising: a discharge valve configured to draw in the fresh air.

12. The air suspension system according to claim 11, wherein the compressed-air system is configured to be precharged to a basic pressure corresponding to an average vehicle load.

13. The air suspension system according to claim 11, further comprising: a pressure tank, the pump being integrated in the pressure tank.

14. The air suspension system according to claim 11, further comprising: a connecting line including an integrated bypass valve arranged between the intake side of the pump and the pressure side of the pump, the bypass valve being configured to at least intermittently open the connecting line during an acceleration operation of a pump drive.

15. The air suspension system according to claim 7, further comprising:
   a non-return valve configured to draw in the fresh air and to open in a suction direction.

16. The air suspension system according to claim 15, wherein the compressed-air system is configured to be precharged to a basic pressure corresponding to an average vehicle load.

17. The air suspension system according to claim 15, further comprising: a pressure tank, the pump being integrated in the pressure tank.

18. The air suspension system according to claim 15, further comprising: a connecting line including an integrated bypass valve arranged between the intake side of the pump and the pressure side of the pump, the bypass valve being configured to at least intermittently open the connecting line during an acceleration operation of a pump drive.

19. The air suspension system according to claim 1, further comprising:
   a connecting line including an integrated bypass valve arranged between the intake side of the pump and the pressure side of the pump, the bypass valve being configured to at least intermittently open the connecting line during an acceleration operation of a pump drive.

* * * * *

UNITED STATES PATENT AND TRADEMARK OFFICE
CERTIFICATE OF CORRECTION

PATENT NO. : 6,698,778 B2
DATED : March 2, 2004
INVENTOR(S) : Roemer et al.

It is certified that error appears in the above-identified patent and that said Letters Patent is hereby corrected as shown below:

Column 1,
Line 7, change "wheel at least" to -- wheel at at least --;

Column 3,
Line 25, change "which is lead" to -- which is led --; and

Column 5,
Line 53, change "staring" to -- starting --.

Signed and Sealed this

Twenty-first Day of February, 2006

JON W. DUDAS
*Director of the United States Patent and Trademark Office*